US012234680B2

(12) United States Patent
Ahn

(10) Patent No.: US 12,234,680 B2
(45) Date of Patent: Feb. 25, 2025

(54) VEHICLE FOR RECOGNIZING ROAD SIGN USING AT LEAST ONE SENSOR AND METHOD THEREOF

(71) Applicant: HYUNDAI MOBIS CO., LTD., Seoul (KR)

(72) Inventor: Hyun Chan Ahn, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 243 days.

(21) Appl. No.: 17/967,051

(22) Filed: Oct. 17, 2022

(65) Prior Publication Data
US 2023/0175304 A1 Jun. 8, 2023

(30) Foreign Application Priority Data
Dec. 8, 2021 (KR) .................. 10-2021-0174482

(51) Int. Cl.
*E05F 15/71* (2015.01)
*B60K 35/00* (2024.01)
*G06V 20/58* (2022.01)

(52) U.S. Cl.
CPC ............ *E05F 15/71* (2015.01); *G06V 20/582* (2022.01); *B60K 35/00* (2013.01); *E05Y 2400/44* (2013.01); *E05Y 2400/45* (2013.01); *E05Y 2900/542* (2013.01)

(58) Field of Classification Search
CPC ....... E05F 15/71; G06V 20/582; B60K 35/00; B60K 35/29; B60K 35/28; B60W 40/02; B60W 30/182; B60J 7/043
See application file for complete search history.

(56) References Cited

U.S. PATENT DOCUMENTS

| | | | |
|---|---|---|---|
| 10,528,055 B2 * | 1/2020 | Kappauf | G01C 21/3837 |
| 2016/0170414 A1 * | 6/2016 | Chen | G01C 21/3841 |
| | | | 701/27 |

FOREIGN PATENT DOCUMENTS

KR 100536357 B1 * 12/2012 .............. B60J 7/043

OTHER PUBLICATIONS

Machine translation of KR100536357B1 downloaded from IP.com (Year: 2024).*

* cited by examiner

*Primary Examiner* — Michael V Kerrigan
*Assistant Examiner* — Tanya C Sienko
(74) *Attorney, Agent, or Firm* — NSIP Law

(57) ABSTRACT

A vehicle includes a camera to recognize at least one sign installed on a road and a controller to determine a type of the at least one sign, in a case in which the at least one sign corresponds to a road freezing sign based on referring to a memory, determine whether a temperature sensed by a temperature sensor installed outside the vehicle is a freezing danger temperature, and in a case in which the temperature sensed by the temperature sensor corresponds to the freezing danger temperature, determine whether a drive mode of the vehicle is set to a winter mode. The controller displays a winter mode automatic switching notification message through an instrument panel and to transmit a command for switching to the winter mode to a drive mode controller in a case in which the drive mode of the vehicle is not set to the winter mode.

9 Claims, 8 Drawing Sheets (a) (b) (c)

VEHICLE FOR RECOGNIZING ROAD SIGN USING AT LEAST ONE SENSOR AND METHOD THEREOF

CROSS-REFERENCE TO RELATED APPLICATION

Pursuant to 35 U.S.C. § 119(a), this application claims the benefit of earlier filing date and right of priority to Korean Application No. 10-2021-0174482, filed on Dec. 8, 2021, the contents of which are hereby incorporated by reference herein in their entirety.

BACKGROUND

Field

The present embodiments are applicable to vehicles of all fields, and more specifically, to a technology capable of recognizing a road sign by a vehicle using various sensors.

Discussion of the Related Art

The Society of Automotive Engineers (SAE), the American Society of Automotive Engineers, subdivides autonomous driving levels into six levels, for example, from level 0 to level 5. However, full automation of level 5 has not yet been commercialized.

Therefore, according to the technology so far, a driver should visually check the signs installed throughout the road and manually respond accordingly. Thus, the driver is unable to concentrate on driving, and the number of unexpected accidents is increasing.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Accordingly, embodiments of the present disclosure are directed to a vehicle for recognizing a road sign using at least one sensor and method thereof that substantially obviate one or more problems due to limitations and disadvantages of the related art.

To solve the above-described problems, the present disclosure is designed to automatically control a vehicle based on a type of sign information recognized via a front camera and the like and various sensing informations.

In one general aspect, a method of controlling a vehicle includes receiving information related to a plurality of signs of different types installed on a road, determining whether each of the plurality of signs is related to an external temperature of the vehicle or an external wind speed of the vehicle, and calculating distance information between the plurality of the signs when all of the signs are related to the external wind speed of the vehicle The signs related to the external wind speed of the vehicle may correspond to a crosswind warning signal and a falling stone warning sign.

The method may include, when the distance information is within 100 m, sensing the external wind speed of the vehicle only once before 30 m based on a preceding one of the crosswind warning sign and the falling stone warning sign.

The method may include determining whether to close a sunroof of the vehicle based on the external wind speed of the vehicle.

In another general aspect, a method of controlling a vehicle using at least one sensor includes: recognizing at least one sign installed on a road using a front camera; determining a type of the at least one sign; in a case in which the at least one sign corresponds to a road freezing sign based on referring to a memory, determining whether a temperature sensed by a temperature sensor installed outside the vehicle is a freezing danger temperature; and in a case in which the temperature sensed by the temperature sensor corresponds to the freezing danger temperature, determining whether a drive mode of the vehicle is set to a winter mode.

The method may include: in a case in which the drive mode of the vehicle is not set to the winter mode, displaying a winter mode automatic switching notification message through an instrument panel; and transmitting a command for switching to the winter mode to a drive mode controller.

In another general aspect, a method of controlling a vehicle using at least one sensor includes: recognizing at least one sign installed on a road using a front camera; determining a type of the at least one sign; in a case in which the at least one sign corresponds to a falling stone warning sign based on referring to a memory, determining whether a speed sensed by a wind speed sensor installed outside the vehicle is a falling stone danger wind speed; and in a case in which the speed sensed by the wind speed sensor corresponds to the falling stone danger wind speed, determining whether a sunroof of the vehicle is in an open state.

The method may include: in a case in which the sunroof of the vehicle is in the open state, displaying a sunroof automatic closing notification message through an instrument panel; and transmitting a command for closing the sunroof to a sunroof controller.

In another general aspect, a method of controlling a vehicle using at least one sensor includes: recognizing at least one sign installed on a road using a front camera; determining a type of the at least one sign; in a case in which the at least one sign corresponds to a crosswind warning sign based on referring to a memory, determining whether a speed sensed by a wind speed sensor installed outside the vehicle is a dangerous wind speed; and in a case in which the speed sensed by the wind speed sensor corresponds to the dangerous wind speed, determining whether a current speed of the vehicle is a dangerous vehicle speed.

The method may include: in a case in which the current speed of the vehicle is the dangerous vehicle speed, displaying a deceleration notification message due to a crosswind through an instrument panel; and transmitting a command for decelerating the current speed of the vehicle to a drive mode controller.

In another general aspect, a vehicle includes: a communication module configured to receive information related to a plurality of signs of different types installed on a road; and a controller configured to determine whether each of the plurality of signs is related to an external temperature of the vehicle or an external wind speed of the vehicle and calculate distance information between the plurality of the signs when all of the signs are related to the external wind speed of the vehicle.

In another general aspect, a vehicle includes: a camera configured to recognize at least one sign installed on a road; and a controller configured to determine a type of the at least one sign, in a case in which the at least one sign corresponds to a road freezing sign based on referring to a memory, determine whether a temperature sensed by a temperature sensor installed outside the vehicle is a freezing danger temperature, and in a case in which the temperature sensed by the temperature sensor corresponds to the freezing danger temperature, determine whether a drive mode of the vehicle is set to a winter mode.

In another general aspect, a vehicle includes: a camera configured to recognize at least one sign installed on a road; and a controller configured to determine a type of the at least one sign, in a case in which the at least one sign corresponds to a falling stone warning sign based on referring to a memory, determine whether a speed sensed by a wind speed sensor installed outside the vehicle is a falling stone danger wind speed, and in a case in which the speed sensed by the wind speed sensor corresponds to the falling stone danger wind speed, determine whether a sunroof of the vehicle is in an open state.

In another general aspect, a vehicle includes: a camera configured to recognize at least one sign installed on a road; and a controller configured to determine a type of the at least one sign, in a case in which the at least one sign corresponds to a crosswind warning sign based on referring to a memory, determine whether a speed sensed by a wind speed sensor installed outside the vehicle is a dangerous wind speed, and in a caser in which the speed sensed by the wind speed sensor corresponds to the dangerous wind speed, determine whether a current speed of the vehicle is a dangerous vehicle speed.

According to one embodiment of the present disclosure, by determining a freezing danger section based on a road freezing sign and temperature information received from a temperature sensor, a vehicle is designed to automatically enter a winter mode.

A winter mode in the present specification means, for example, changing a vehicle driving mode to an optimal condition in a freezing danger section.

More specifically, normally in a standard (S) mode, transmission gears are controlled to be automatically and sequentially shifted from first, second, third and fourth gear by starting from the first gear. Yet, in a winter (W) mode, the transmission gears are controlled to start from the second or third gear automatically instead of starting from the first gear to prevent vehicle wheels from spinning with no traction when many cars stop and go repeatedly due to heavy traffic jam at a low temperature.

According to another embodiment of the present disclosure, a vehicle is designed to automatically close a sunroof by determining a falling stone danger section based on a sign for falling stone warning and a wind speed information received from a wind speed sensor.

According to further embodiment of the present disclosure, the speed of a vehicle is designed to be automatically decelerated based on a signboard for cross-wind warning and a wind speed information received from a wind speed sensor.

Finally, in the process of implementing the present disclosure, sensing information is necessarily required, and thus it is intended to propose a solution for minimizing frequent sensing.

Technical tasks obtainable from the present disclosure are non-limited by the above-mentioned technical tasks. And, other unmentioned technical tasks can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, provided is a method of controlling a vehicle recognizing a road sign using at least one sensor, the method including receiving a plurality of sign informations of different types installed on a road, determining whether a plurality of the received sign informations are related to an external temperature of the vehicle or an external wind speed of the vehicle, and calculating distance information between a plurality of the signs only if all of a plurality of the received sign informations are related to the external wind speed of the vehicle as a result of the determination.

In another aspect of the present disclosure, as embodied and broadly described herein, provided is a method of controlling a vehicle recognizing a road sign using at least one sensor, the method including recognizing at least one sign installed on a road using a front camera, primarily determining a type of the recognized sign, if the determined sign corresponds to a road freezing sign based on referring to a memory, secondarily determining whether a temperature sensed by a temperature sensor installed outside the vehicle is a freezing danger temperature, and if the detected temperature corresponds to the freezing danger temperature, tertiarily determining whether a drive mode of the vehicle is set to a winter mode.

In further aspect of the present disclosure, as embodied and broadly described herein, provided is a method of controlling a vehicle recognizing a road sign using at least one sensor, the method including recognizing at least one sign installed on a road using a front camera, primarily determining a type of the recognized sign, if the determined sign corresponds to a falling stone warning sign based on referring to a memory, secondarily determining whether a speed sensed by a wind speed sensor installed outside the vehicle is a falling stone danger wind speed, and if the sensed speed corresponds to the falling stone danger wind speed, tertiarily determining whether a sunroof of the vehicle is in an open state.

In another further aspect of the present disclosure, as embodied and broadly described herein, provided is a method of controlling a vehicle recognizing a road sign using at least one sensor, the method including recognizing at least one sign installed on a road using a front camera, primarily determining a type of the recognized sign, if the determined sign corresponds to a crosswind warning sign based on referring to a memory, secondarily determining whether a speed sensed by a wind speed sensor installed outside the vehicle is a dangerous wind speed, and if the sensed speed corresponds to the dangerous wind speed, tertiarily determining whether a current speed of the vehicle is a dangerous vehicle speed.

Accordingly, the present disclosure provides various effects and/or advantages.

According to one of embodiments of the present disclosure, there are technical effects of automatically entering a winter mode in a freezing section without a driver's manual mode selection to improve vehicle safety, expect an accident prevention effect, and improve driver convenience by entering the winter mode automatically.

According to one of embodiments of the present disclosure, if a sunroof is open in a falling-stone danger section, it has the advantage of automatically closing the sunroof without a driver's manual selection to improve vehicle safety, expect accident prevention effects, and improve driver convenience through automatic sunroof closing.

According to one of embodiments of the present disclosure, if wind is strong in a danger section due to a crosswind, it has the effect of lowering a vehicle speed to improve vehicle safety and increase driver's danger awareness.

According to one of embodiments of the present disclosure, there is an advantage of reducing a process of collecting external sensing information too often.

Effects obtainable from the present disclosure may be non-limited by the above-mentioned effect. And, other unmentioned effects can be clearly understood from the following description by those having ordinary skill in the technical field to which the present disclosure pertains. It is to be understood that both the foregoing general description and the following detailed description of the present disclosure are exemplary and explanatory and are intended to provide further explanation of the disclosure as claimed.

Other features and aspects will be apparent from the following detailed description, the drawings, and the claims.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings.

DETAILED DESCRIPTION

Figure 1:
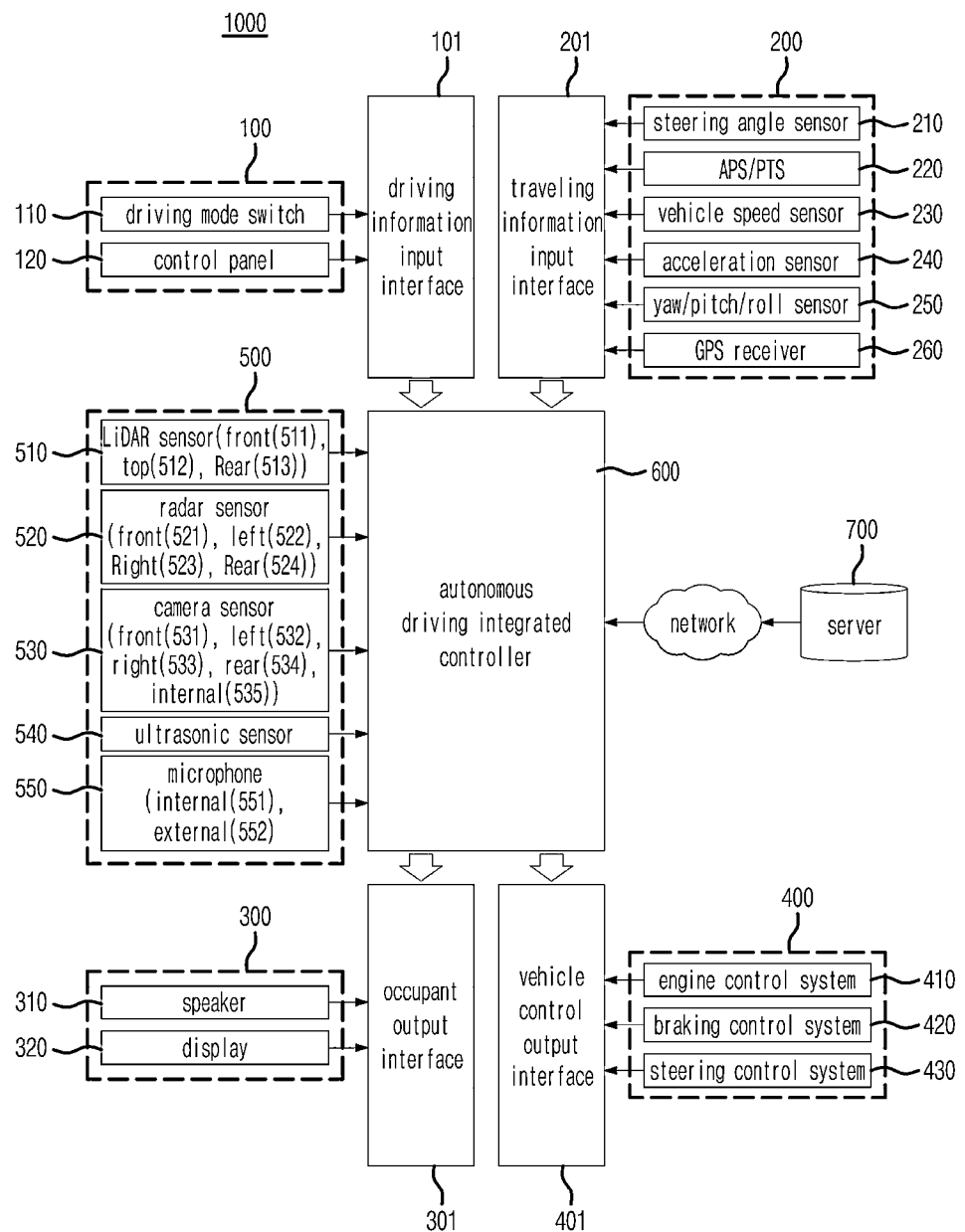
FIG. 1 is an overall block diagram of an autonomous driving control system to which an autonomous driving apparatus according to any one of embodiments of the present disclosure is applicable.

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

Figure 2:
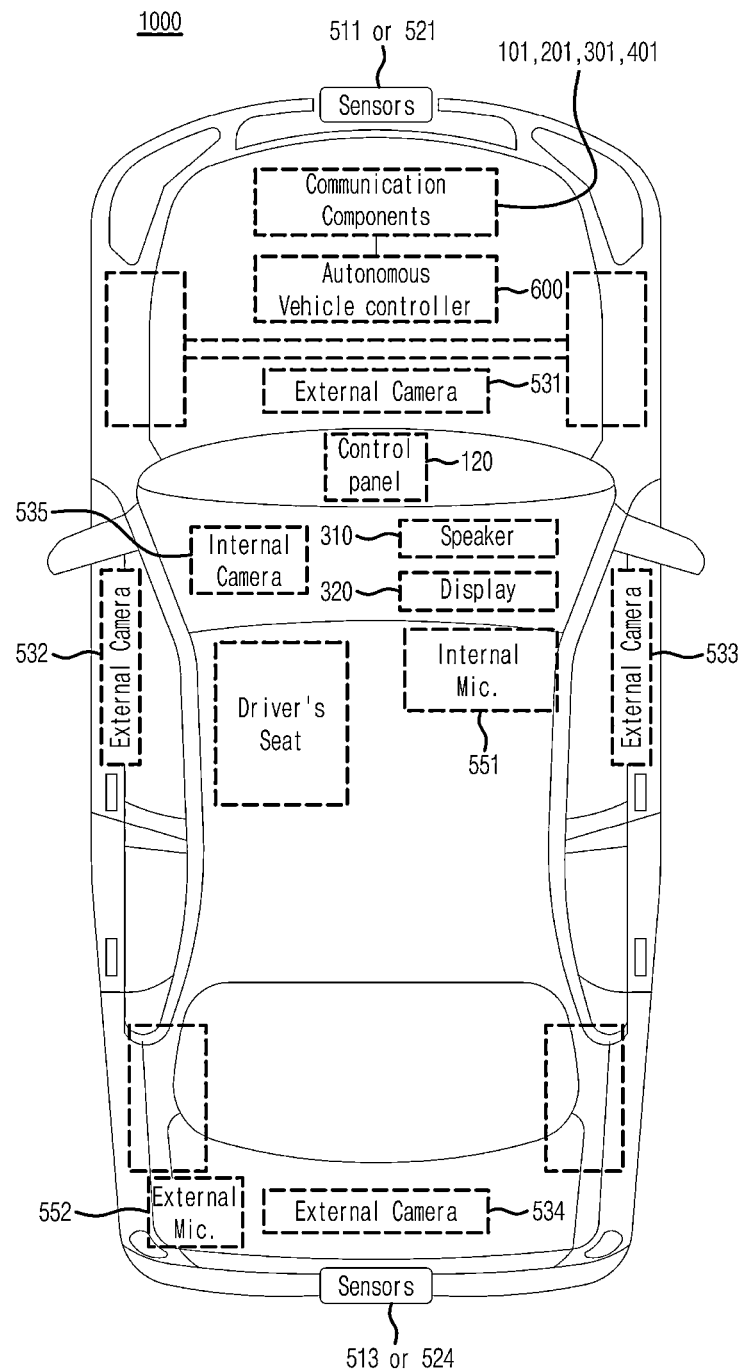
FIG. 2 is a diagram illustrating an example in which an autonomous driving apparatus according to any one of embodiments of the present disclosure is applied to a vehicle.

FIG. 1 is an overall block diagram of an autonomous driving control system to which an autonomous driving apparatus according to any one of embodiments of the present disclosure is applicable. FIG. 2 is a diagram illustrating an example in which an autonomous driving apparatus according to any one of embodiments of the present disclosure is applied to a vehicle.

First, a structure and function of an autonomous driving control system (e.g., an autonomous driving vehicle) to which an autonomous driving apparatus according to the present embodiments is applicable will be described with reference to FIGS. 1 and 2.

As illustrated in FIG. 1, an autonomous driving vehicle 1000 may be implemented based on an autonomous driving integrated controller 600 that transmits and receives data necessary for autonomous driving control of a vehicle through a driving information input interface 101, a traveling information input interface 201, an occupant output interface 301, and a vehicle control output interface 401. However, the autonomous driving integrated controller 600 may also be referred to herein as a controller, a processor, or, simply, a controller.

The autonomous driving integrated controller 600 may obtain, through the driving information input interface 101, driving information based on manipulation of an occupant for a user input unit 100 in an autonomous driving mode or manual driving mode of a vehicle. As illustrated in FIG. 1, the user input unit 100 may include a driving mode switch 110 and a control panel 120 (e.g., a navigation terminal mounted on the vehicle or a smartphone or tablet computer owned by the occupant). Accordingly, driving information may include driving mode information and navigation information of a vehicle.

For example, a driving mode (i.e., an autonomous driving mode/manual driving mode or a sports mode/eco mode/safety mode/normal mode) of the vehicle determined by manipulation of the occupant for the driving mode switch 110 may be transmitted to the autonomous driving integrated controller 600 through the driving information input interface 101 as the driving information.

Furthermore, navigation information, such as the destination of the occupant input through the control panel 120 and a path up to the destination (e.g., the shortest path or preference path, selected by the occupant, among candidate paths up to the destination), may be transmitted to the autonomous driving integrated controller 600 through the driving information input interface 101 as the driving information.

The control panel 120 may be implemented as a touch-screen panel that provides a user interface (UI) through which the occupant inputs or modifies information for autonomous driving control of the vehicle. In this case, the driving mode switch 110 may be implemented as touch buttons on the control panel 120.

In addition, the autonomous driving integrated controller 600 may obtain traveling information indicative of a driving state of the vehicle through the traveling information input interface 201. The traveling information may include a steering angle formed when the occupant manipulates a steering wheel, an accelerator pedal stroke or brake pedal stroke formed when the occupant depresses an accelerator pedal or brake pedal, and various types of information indicative of driving states and behaviors of the vehicle, such as a vehicle speed, acceleration, a yaw, a pitch, and a roll formed in the vehicle. The traveling information may be detected by a traveling information detection unit 200, including a steering angle sensor 210, an accelerator position sensor (APS)/pedal travel sensor (PTS) 220, a vehicle speed sensor 230, an acceleration sensor 240, and a yaw/pitch/roll sensor 250, as illustrated in FIG. 1.

Furthermore, the traveling information of the vehicle may include location information of the vehicle. The location information of the vehicle may be obtained through a global positioning system (GPS) receiver 260 applied to the vehicle. Such traveling information may be transmitted to the autonomous driving integrated controller 600 through the traveling information input interface 201 and may be used to control the driving of the vehicle in the autonomous driving mode or manual driving mode of the vehicle.

The autonomous driving integrated controller 600 may transmit driving state information provided to the occupant to an output unit 300 through the occupant output interface 301 in the autonomous driving mode or manual driving mode of the vehicle. That is, the autonomous driving integrated controller 600 transmits the driving state information of the vehicle to the output unit 300 so that the occupant may check the autonomous driving state or manual driving state of the vehicle based on the driving state information output through the output unit 300. The driving state information may include various types of information indicative of driving states of the vehicle, such as a current driving mode, transmission range, and speed of the vehicle.

If it is determined that it is necessary to warn a driver in the autonomous driving mode or manual driving mode of the vehicle along with the above driving state information, the autonomous driving integrated controller 600 transmits warning information to the output unit 300 through the occupant output interface 301 so that the output unit 300 may output a warning to the driver. In order to output such driving state information and warning information acoustically and visually, the output unit 300 may include a speaker 310 and a display 320 as illustrated in FIG. 1. In this case, the display 320 may be implemented as the same device as the control panel 120 or may be implemented as an independent device separated from the control panel 120.

Furthermore, the autonomous driving integrated controller 600 may transmit control information for driving control of the vehicle to a lower control system 400, applied to the vehicle, through the vehicle control output interface 401 in the autonomous driving mode or manual driving mode of the vehicle. As illustrated in FIG. 1, the lower control system 400 for driving control of the vehicle may include an engine control system 410, a braking control system 420, and a steering control system 430. The autonomous driving integrated controller 600 may transmit engine control information, braking control information, and steering control information, as the control information, to the respective lower control systems 410, 420, and 430 through the vehicle control output interface 401. Accordingly, the engine control system 410 may control the speed and acceleration of the vehicle by increasing or decreasing fuel supplied to an engine. The braking control system 420 may control the braking of the vehicle by controlling braking power of the vehicle. The steering control system 430 may control the steering of the vehicle through a steering device (e.g., motor driven power steering (MDPS) system) applied to the vehicle.

As described above, the autonomous driving integrated controller 600 according to the present embodiment may obtain the driving information based on manipulation of the driver and the traveling information indicative of the driving state of the vehicle through the driving information input interface 101 and the traveling information input interface 201, respectively, and transmit the driving state information and the warning information, generated based on an autonomous driving algorithm, to the output unit 300 through the occupant output interface 301. In addition, the autonomous driving integrated controller 600 may transmit the control information generated based on the autonomous driving algorithm to the lower control system 400 through the vehicle control output interface 401 so that driving control of the vehicle is performed.

In order to guarantee stable autonomous driving of the vehicle, it is necessary to continuously monitor the driving state of the vehicle by accurately measuring a driving environment of the vehicle and to control driving based on the measured driving environment. To this end, as illustrated in FIG. 1, the autonomous driving apparatus according to the present embodiment may include a sensor unit 500 for detecting a nearby object of the vehicle, such as a nearby vehicle, pedestrian, road, or fixed facility (e.g., a signal light, a signpost, a traffic sign, or a construction fence).

The sensor unit 500 may include one or more of a LiDAR sensor 510, a radar sensor 520, or a camera sensor 530, in order to detect a nearby object outside the vehicle, as illustrated in FIG. 1.

The LiDAR sensor 510 may transmit a laser signal to the periphery of the vehicle and detect a nearby object outside the vehicle by receiving a signal reflected and returning from a corresponding object. The LiDAR sensor 510 may detect a nearby object located within the ranges of a preset distance, a preset vertical field of view, and a preset horizontal field of view, which are predefined depending on specifications thereof. The LiDAR sensor 510 may include a front LiDAR sensor 511, a top LiDAR sensor 512, and a rear LiDAR sensor 513 installed at the front, top, and rear of the vehicle, respectively, but the installation location of each LiDAR sensor and the number of LiDAR sensors installed are not limited to a specific embodiment. A threshold for determining the validity of a laser signal reflected and returning from a corresponding object may be previously stored in a memory (not illustrated) of the autonomous driving integrated controller 600. The autonomous driving integrated controller 600 may determine a location (including a distance to a corresponding object), speed, and moving direction of the corresponding object using a method of measuring time taken for a laser signal, transmitted through the LiDAR sensor 510, to be reflected and returning from the corresponding object.

The radar sensor 520 may radiate electromagnetic waves around the vehicle and detect a nearby object outside the vehicle by receiving a signal reflected and returning from a corresponding object. The radar sensor 520 may detect a nearby object within the ranges of a preset distance, a preset vertical field of view, and a preset horizontal field of view, which are predefined depending on specifications thereof. The radar sensor 520 may include a front radar sensor 521, a left radar sensor 522, a right radar sensor 523, and a rear radar sensor 524 installed at the front, left, right, and rear of the vehicle, respectively, but the installation location of each radar sensor and the number of radar sensors installed are not limited to a specific embodiment. The autonomous driving integrated controller 600 may determine a location (including a distance to a corresponding object), speed, and moving direction of the corresponding object using a method of analyzing power of electromagnetic waves transmitted and received through the radar sensor 520.

The camera sensor 530 may detect a nearby object outside the vehicle by photographing the periphery of the vehicle and detect a nearby object within the ranges of a preset distance, a preset vertical field of view, and a preset horizontal field of view, which are predefined depending on specifications thereof.

The camera sensor 530 may include a front camera sensor 531, a left camera sensor 532, a right camera sensor 533, and a rear camera sensor 534 installed at the front, left, right, and rear of the vehicle, respectively, but the installation location of each camera sensor and the number of camera sensors installed are not limited to a specific embodiment. The autonomous driving integrated controller 600 may determine a location (including a distance to a corresponding object), speed, and moving direction of the corresponding object by applying predefined image processing to an image captured by the camera sensor 530.

In addition, an internal camera sensor 535 for capturing the inside of the vehicle may be mounted at a predetermined location (e.g., rear view mirror) within the vehicle. The autonomous driving integrated controller 600 may monitor a behavior and state of the occupant based on an image captured by the internal camera sensor 535 and output guidance or a warning to the occupant through the output unit 300.

As illustrated in FIG. 1, the sensor unit 500 may further include an ultrasonic sensor 540 in addition to the LiDAR sensor 510, the radar sensor 520, and the camera sensor 530 and further adopt various types of sensors for detecting a nearby object of the vehicle along with the sensors.

FIG. 2 illustrates an example in which, in order to aid in understanding the present embodiment, the front LiDAR sensor 511 or the front radar sensor 521 is installed at the front of the vehicle, the rear LiDAR sensor 513 or the rear radar sensor 524 is installed at the rear of the vehicle, and the front camera sensor 531, the left camera sensor 532, the right camera sensor 533, and the rear camera sensor 534 are installed at the front, left, right, and rear of the vehicle, respectively. However, as described above, the installation location of each sensor and the number of sensors installed are not limited to a specific embodiment.

Furthermore, in order to determine a state of the occupant within the vehicle, the sensor unit 500 may further include a bio sensor for detecting bio signals (e.g., heart rate, electrocardiogram, respiration, blood pressure, body temperature, electroencephalogram, photoplethysmography (or pulse wave), and blood sugar) of the occupant. The bio sensor may include a heart rate sensor, an electrocardiogram sensor, a respiration sensor, a blood pressure sensor, a body temperature sensor, an electroencephalogram sensor, a photoplethysmography sensor, and a blood sugar sensor.

Finally, the sensor unit 500 additionally includes a microphone 550 having an internal microphone 551 and an external microphone 552 used for different purposes.

The internal microphone 551 may be used, for example, to analyze the voice of the occupant in the autonomous driving vehicle 1000 based on AI or to immediately respond to a direct voice command of the occupant.

In contrast, the external microphone 552 may be used, for example, to appropriately respond to safe driving by analyzing various sounds generated from the outside of the autonomous driving vehicle 1000 using various analysis tools such as deep learning.

For reference, the symbols illustrated in FIG. 2 may perform the same or similar functions as those illustrated in FIG. 1. FIG. 2 illustrates in more detail a relative positional relationship of each component (based on the interior of the autonomous driving vehicle 1000) as compared with FIG. 1.

In FIGS. 1 and 2, the vehicle equipped with an autonomous driving function has been exemplarily described as an embodiment of the present disclosure. However, the present disclosure may also be applied to a general vehicle having only a part of the autonomous driving function or no autonomous driving function at all.

Figure 3:
FIG. 3 is a diagram showing various types of signs recognizable by a vehicle according to one of embodiments of the present disclosure.
Figure 3:
Figure 3:
Figure 3:
Figure 3:

FIG. 3 is a diagram showing various types of signs recognizable by a vehicle according to one of embodiments of the present disclosure.

As described above, the vehicle according to one embodiment of the present disclosure includes various sensors including the front camera sensor 531 illustrated in FIG. 1 and FIG. 2, and may be designed to recognize various sign information on the road shown in FIG. 3.

In order to implement this, a function of meaning each image of a sign is stored in a memory of a vehicle. Of course, it is also possible to design that an image obtained through a camera of a vehicle according to one embodiment of the present disclosure is transmitted to a server to identify the meaning of the corresponding sign.

First, the signs shown in FIG. 3(*a*) are signs for guiding freezing danger, the sign shown in FIG. 3(*b*) is a sign for guiding falling stone warning, and the sign shown in FIG. 3(*c*) is a sign for guiding crosswind warning. In addition, country-specific sign information on a road driven by a vehicle is stored in a memory, and it is designed to more accurately detect the meaning of the sign through a GPS sensor mounted on a vehicle, which pertains to another scope of right of the present disclosure.

Particularly, embodiments of the present disclosure are designed to operate with different algorithms depending on various types of signs, and will be described in more detail with reference to FIGS. 4 to 7.

Figure 4:
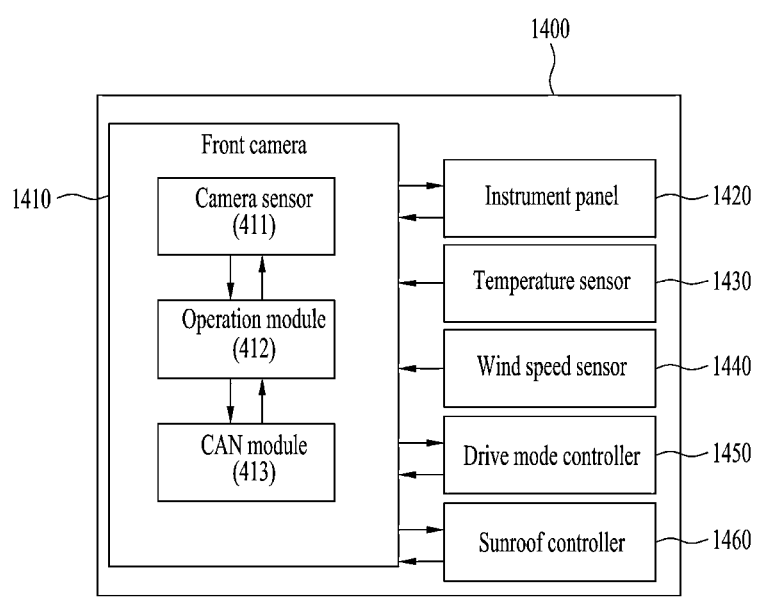
FIG. 4 is a block diagram showing main components of a vehicle that recognizes a road sign using at least one sensor according to one of embodiments of the present disclosure.

FIG. 4 is a block diagram showing main components of a vehicle that recognizes a road sign using at least one sensor according to one of embodiments of the present disclosure.

Main components in a vehicle for implementing various embodiments of the present disclosure are shown in FIG. 4. The components illustrated in FIG. 4 may be implemented in software, hardware, or a combination thereof.

As shown in FIG. 4, a vehicle 1400 according to one embodiment of the present disclosure includes a front camera 1410, an instrument panel 1420, a temperature sensor 1430, a wind speed sensor 1440, a drive mode controller 1450, a sunroof controller 1460, and the like. Then, the front camera 1410 includes a camera sensor 411, an operation module 412, and a CAN module 413. Of course, deleting, adding, and changing some components according to the needs of those skilled in the art fall within the scope of other rights of the present disclosure, and in principle, the scope of rights of the present disclosure should be determined according to the matters described in the claims.

When the camera sensor 411 captures signs such as road freezing, falling stones, and crosswind warnings and transmits them to the operation module 412, the operation module 412 determines the meaning of the captured signs with reference to a memory (not shown) and the like.

For example, the operation module 412 may determine whether to automatically enter a winter mode based on road freezing sign information, temperature sensor information, drive mode state information, etc. A more specific embodiment will be described later in more detail with reference to FIG. 5.

Furthermore, the operation module 412 determines a falling stone danger section based on falling stone warning sign information and wind speed information, and finally determines whether to automatically close the sunroof. A more specific embodiment will be described later in more detail with reference to FIG. 6.

In addition, the operation module 412 determines whether to control deceleration of the vehicle based on crosswind warning sign information and wind speed information. A more specific embodiment will be described below in more detail with reference to FIG. 7.

The CAN module 413 transmits vehicle external state information received from the temperature sensor 1430 and the wind speed sensor 1440 to the operation module 412.

Furthermore, the CAN module 413 serves to transmit and receive data between the instrument panel 1420/drive mode controller 1450/sunroof controller 1460 and the operation module 412.

The instrument panel 1420 displays automatic winter mode entry related information, displays automatic sunroof closing related information, or displays information related to vehicle speed control due to crosswind.

The temperature sensor 1430 senses the temperature outside the vehicle and transmits the temperature to the operation module 412 through the CAN module 413. Meanwhile, the wind speed sensor 1440 senses the wind speed outside the vehicle and transmits the sensed wind speed to the operation module 412 through the CAN module 413.

The drive mode controller 1450 receives a winter mode entry command from the operation module 412 and controls the vehicle to enter the winter mode. Then, the drive mode controller 1450 transmits a changed drive mode state signal to the operation module 412. Accordingly, by checking the changed state in real time, there is an effect of reducing the possibility of an error of the operation module 412.

The sunroof controller 1460 receives a sunroof automatic closing command from the operation module and controls the sunroof to be closed. The sunroof controller 1460 then transmits a changed state signal to the operation module. Accordingly, by checking the changed state in real time, there is an effect of reducing the possibility of an error of the operation module 412.

Figure 5:
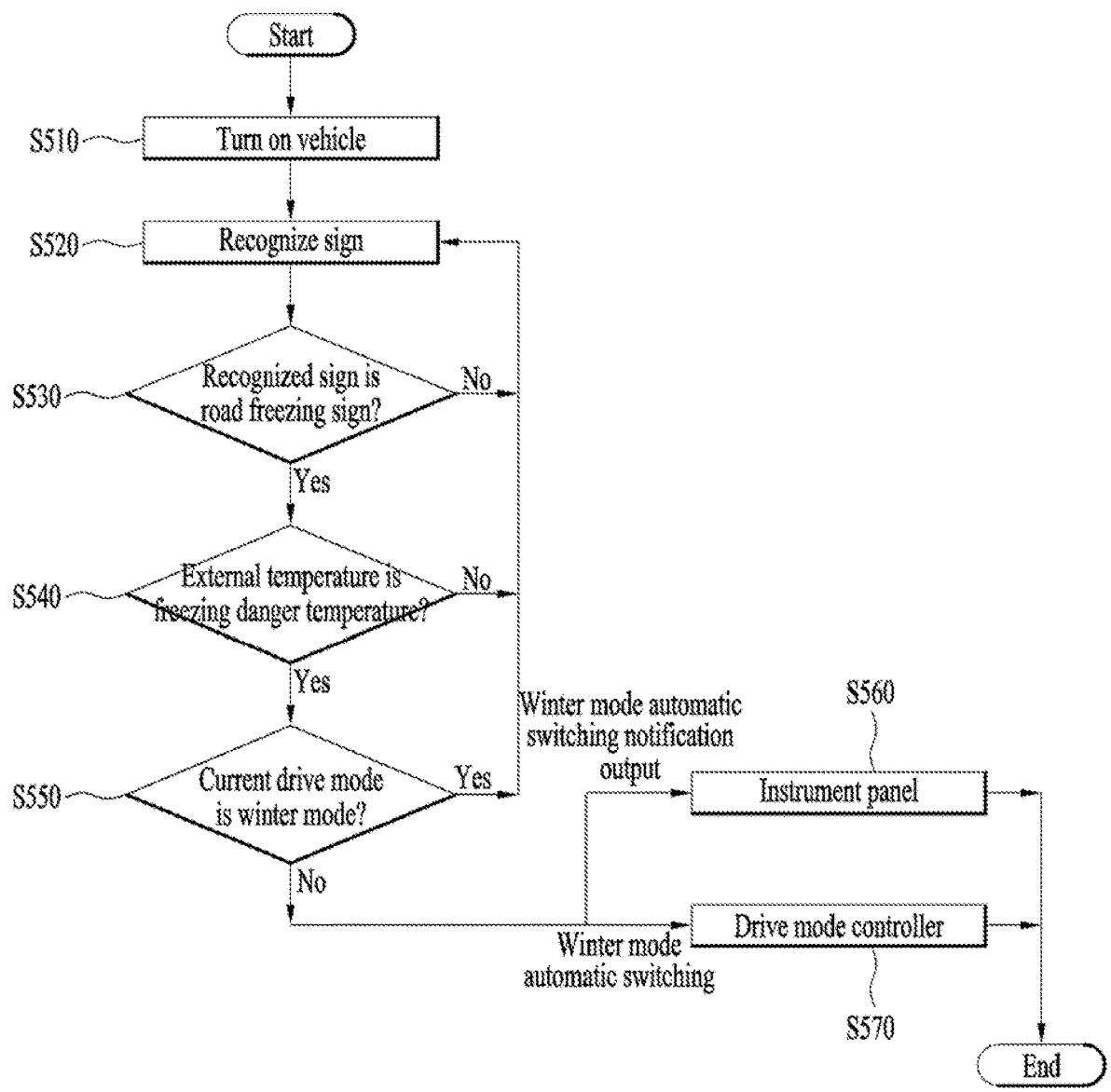
FIG. 5 is a flowchart illustrating a processing process in a time series manner when a sign of a first type is recognized according to one of embodiments of the present disclosure.

FIG. 5 is a flowchart illustrating a processing process in a time series manner when a sign of a first type is recognized according to one of embodiments of the present disclosure.

It is assumed that a vehicle according to one embodiment of the present disclosure is turned on (S510). Furthermore, the vehicle recognizes at least one or more signs installed on the road using a front camera and the like (S520).

A type of the recognized sign is primarily determined, and whether the recognized sign corresponds to a road freezing sign (e.g., FIG. 3(*a*)) is filtered (S530).

By referring to a memory, when the determined sign corresponds to the road freezing sign, it is secondarily determined whether a temperature sensed by a temperature sensor installed outside the vehicle is a freezing danger temperature (S540). For example, the freezing danger temperature may be set to 3 degrees or less.

When the sensed temperature corresponds to the freezing danger temperature, it is tertiarily determined whether a drive mode of the vehicle is set to a winter mode (S550).

When the drive mode of the vehicle is not set to the winter mode, an automatic winter mode switching notification message is displayed through an instrument panel (S560), and a command for switching to the winter mode is transmitted to a drive mode controller (S570). In particular, by performing the steps S560 and S570 in parallel, there is an advantage of increasing user convenience and reducing the possibility of recognizing malfunction errors. Of course, providing an audible or tactile notification instead of the step S560 described above or additionally falls within the scope of other rights of the present disclosure.

Figure 6:
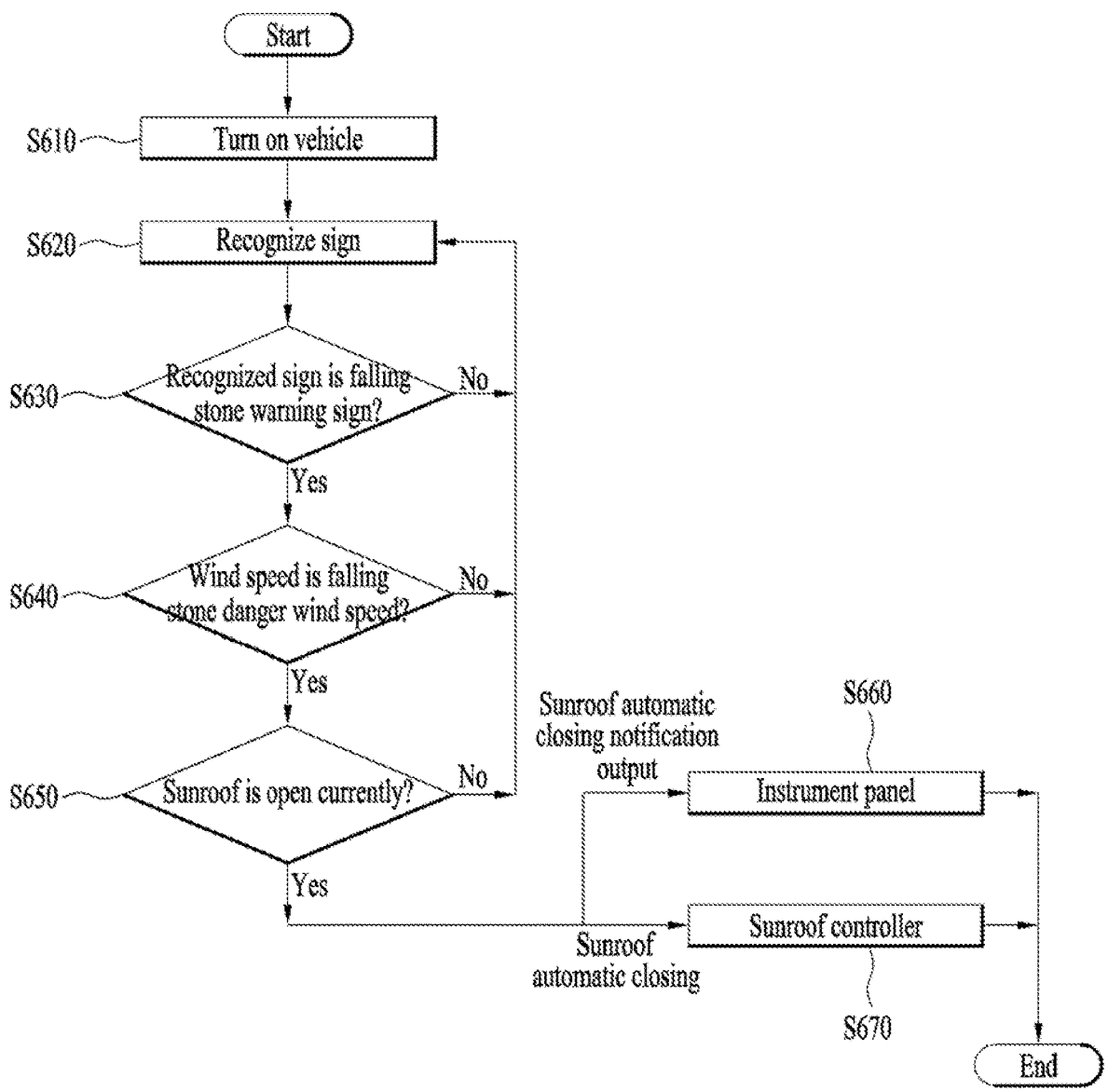
FIG. 6 is a flowchart illustrating a processing process in a time series manner when a sign of a second type is recognized according to one of embodiments of the present disclosure.

FIG. 6 is a flowchart illustrating a processing process in a time series manner when a sign of a second type is recognized according to one of embodiments of the present disclosure.

It is assumed that a vehicle according to one embodiment of the present disclosure is turned on (S610). Furthermore, the vehicle recognizes at least one or more signs installed on the road using a front camera and the like (S620).

A type of the recognized sign is primarily determined, and whether the recognized sign corresponds to a sign of falling stone warning (e.g., FIG. 3(*b*)) is filtered (S630).

By referring to a memory, when the determined sign corresponds to a falling stone warning sign, it is secondarily determined whether a speed sensed by a wind speed sensor installed outside the vehicle is a falling stone danger wind speed (S640). For example, if Wind_speed>S1 (30 km/h), it is determined as a falling stone danger wind speed. Of course, the value of S1, 30 km/h, can be changed and designed according to the needs of those skilled in the art.

When the sensed speed corresponds to the falling stone danger wind speed, it is tertiarily determined whether a sunroof of the vehicle is in an open state (S650).

When the sunroof of the vehicle is in the open state, a sunroof automatic close notification message is displayed through an instrument panel (S660), and a command for closing the sunroof is transmitted to a sunroof controller (S670). In particular, by performing the steps S660 and S670 in parallel, there is an advantage of increasing user convenience and reducing the possibility of recognizing malfunction errors. Of course, providing an audible or tactile notification instead of the step S660 described above or additionally falls within the scope of other rights of the present disclosure.

Figure 7:
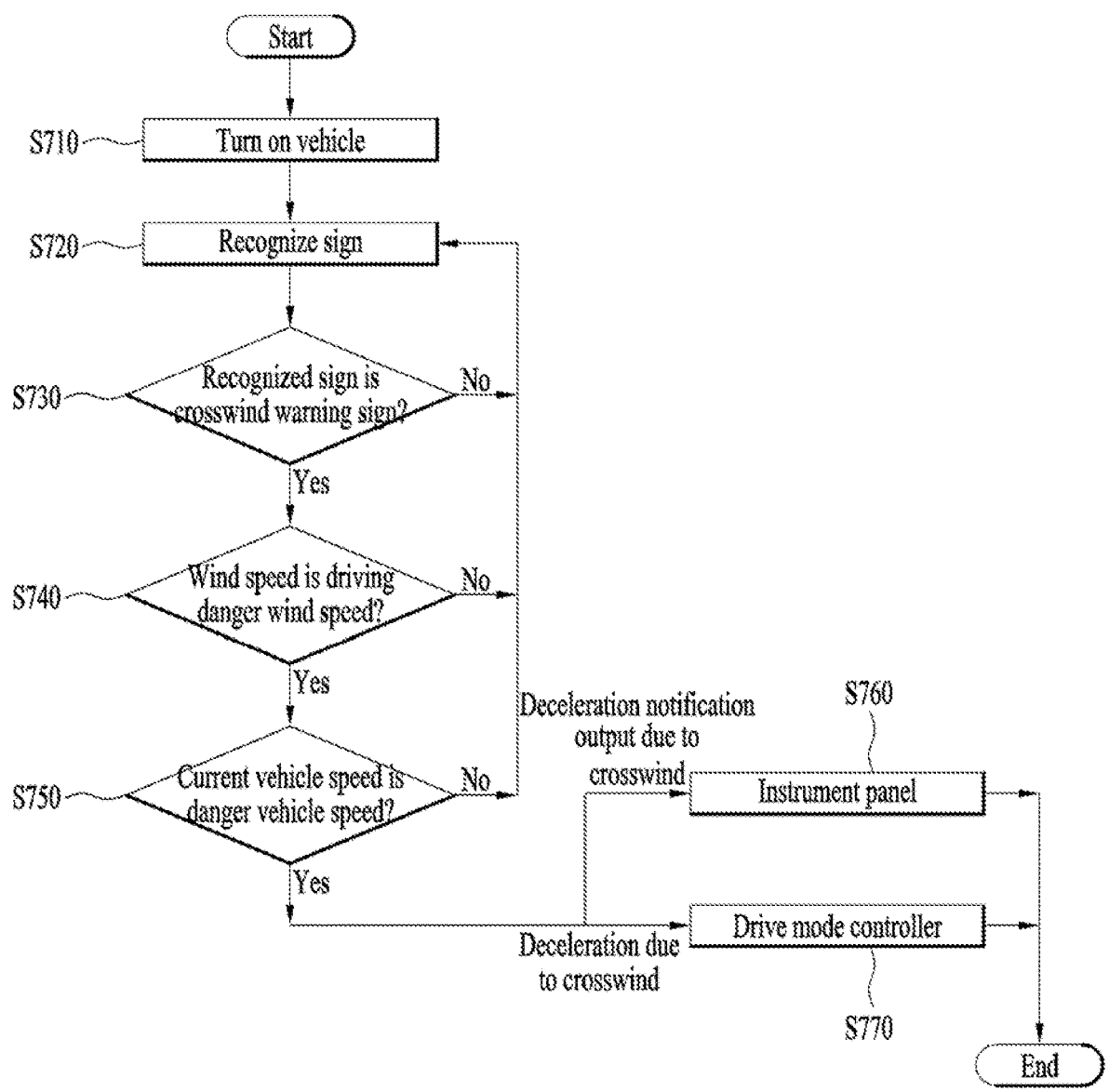
FIG. 7 is a flowchart illustrating a processing process in a time series manner when a sign of a third type is recognized according to one of embodiments of the present disclosure.

FIG. 7 is a flowchart illustrating a processing process in a time series manner when a sign of a third type is recognized according to one of embodiments of the present disclosure.

It is assumed that a vehicle according to one embodiment of the present disclosure is turned on (S710). Furthermore, the vehicle recognizes at least one or more signs installed on the road using a front camera and the like (S720).

A type of the recognized sign is primarily determined, and whether the recognized sign corresponds to a crosswind warning sign (e.g., FIG. 3(*c*)) is filtered (S730).

By referring to a memory, when the determined sign corresponds to a crosswind warning sign, it is secondarily determined whether a speed sensed by a wind speed sensor installed outside the vehicle is a dangerous wind speed (S740). For example, if Wind_speed>S2 (20 km/h), it is determined as a dangerous wind speed. Of course, the value of S2, 20 km/h, can be changed and designed according to the needs of those skilled in the art. In addition, unlike S1, it is different in considering a direction of the wind speed.

When the sensed speed corresponds to the dangerous wind speed, it is tertiarily determined whether a current speed of the vehicle is a dangerous vehicle speed (S750). For example, if Vehicle_speed>V, it is determined as a dangerous vehicle speed. However, it is also a feature of the present disclosure that the V value is changed depending on the wind speed.

When the current speed of the vehicle is the dangerous vehicle speed, a deceleration notification message according to the crosswind is displayed through an instrument panel (S760), and a command for decelerating the vehicle speed is transmitted to a drive mode controller (S770). In particular, by performing the steps S760 and S770 in parallel, there is an advantage of increasing user convenience and reducing the possibility of recognizing malfunction errors. Of course, providing an audible or tactile notification instead of the step S760 described above or additionally falls within the scope of other rights of the present disclosure.

Figure 8:
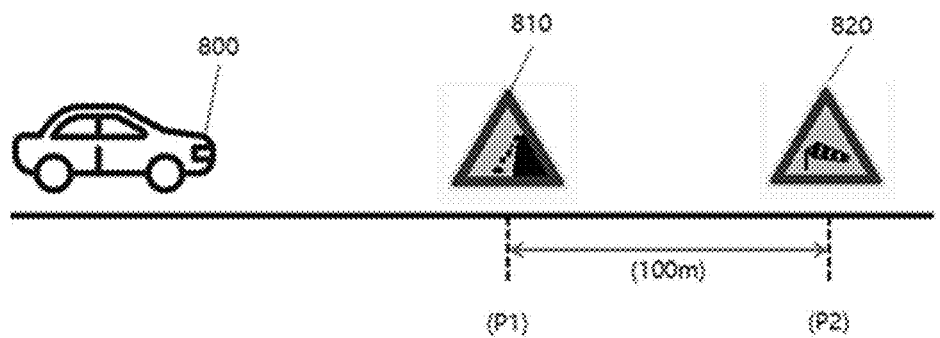
FIG. 8 is a flowchart illustrating a processing process in a time series manner when a plurality of signs of different types are recognized according to one of embodiments of the present disclosure.

FIG. 8 is a flowchart illustrating a processing process in a time series manner when a plurality of signs of different types are recognized according to one of embodiments of the present disclosure.

According to the above-described embodiments, in particular, in the process of implementing FIG. 6 and FIG. 7, a case in which a wind speed sensor outside a vehicle frequently operates may occur. In the embodiment illustrated in FIG. 8, it is intended to propose an algorithm for minimizing the number of sensing times of the wind speed sensor.

A vehicle 800 according to one embodiment of the present disclosure receives information on a plurality of different types of signs 810 and 820 installed on a road. For example, it is possible to use a camera installed in the vehicle 800, to receive sign information on a current road from an external server, such as server 700 in FIG. 1, or to receive sign information on a current road in advance through V2V communication from another vehicle ahead.

Furthermore, the vehicle 800 determines whether the received informations of a plurality of the signs 810 and 820 are related to an external temperature of the vehicle 800 or an external wind speed of the vehicle.

Moreover, as a result of the determination, the vehicle 800 calculates distance information between a plurality of the signs only when all of a plurality of the received sign informations are related to the external wind speed of the vehicle. Both a falling stone warning sign 810 and a crosswind warning sign 820 shown in FIG. 8 are the signs related to the wind speed outside the vehicle 800 as described above.

In this case, when the distance between the first sign 810 and the second sign 820 is within 100 m, it is designed to sense the wind speed outside the vehicle only once before 30 m based on the preceding sign 810.

In this way, it is designed to determine whether to decelerate the vehicle 800 and whether to close a sunroof of the vehicle 800 based on the external wind speed sensed once. Therefore, it is possible to solve a problem of frequently sensing an external wind speed unnecessarily.

In another aspect of the present disclosure, the above-described proposal or operation of the present disclosure may be provided as codes that may be implemented, embodied or executed by a "computer" (System on Chip (SoC)), an application storing or containing the codes, a computer-readable storage medium, a computer program product, and the like, which also comes within the scope of the present disclosure.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Accordingly, the present disclosure is not intended to be limited to the embodiments shown herein, but to give the broadest scope that matches the principles and novel features disclosed herein.

What is claimed is:

1. A method of controlling a vehicle, the method comprising:
   receiving information related to a plurality of signs of different types installed on a road;
   determining whether each of the plurality of signs is related to an external temperature of the vehicle or an external wind speed of the vehicle;
   calculating distance information between the plurality of the signs when all of the signs are related to the external wind speed of the vehicle;
   recognizing at least one sign, from among the plurality of signs, installed on the road using a front camera;
   determining a type of the at least one sign;
   in a case in which the at least one sign corresponds to a road freezing sign based on referring to a memory, determining whether a temperature sensed by a temperature sensor installed outside the vehicle is a freezing danger temperature;
   in a case in which the temperature sensed by the temperature sensor corresponds to the freezing danger temperature, determining whether a drive mode of the vehicle is set to a winter mode;
   in a case in which the drive mode of the vehicle is not set to the winter mode, displaying a winter mode automatic switching notification message through an instrument panel; and
   transmitting a command for switching to the winter mode to a drive mode controller.

2. The method of claim 1, wherein the signs related to the external wind speed of the vehicle correspond to a crosswind warning signal and a falling stone warning sign.

3. The method of claim 2, further comprising when the distance information is within 100 m, sensing the external wind speed of the vehicle only once before 30 m based on a preceding one of the crosswind warning sign and the falling stone warning sign.

4. A method of controlling a vehicle, the method comprising:
   receiving information related to a plurality of signs of different types installed on a road;
   determining whether each of the plurality of signs is related to an external temperature of the vehicle or an external wind speed of the vehicle;
   calculating distance information between the plurality of the signs when all of the signs are related to the external wind speed of the vehicle;
   recognizing at least one sign, from among the plurality of signs, installed on the road using a front camera;
   determining a type of the at least one sign;
   in a case in which the at least one sign corresponds to a falling stone warning sign based on referring to a memory, determining whether a speed sensed by a wind speed sensor installed outside the vehicle is a falling stone danger wind speed;

in a case in which the speed sensed by the wind speed sensor corresponds to the falling stone danger wind speed, determining whether a sunroof of the vehicle is in an open state in a case in which the sunroof of the vehicle is in the open state, displaying a sunroof automatic closing notification message through an instrument panel; and transmitting a command for closing the sunroof to a sunroof controller.

5. A method of controlling a vehicle, the method comprising:

receiving information related to a plurality of signs of different types installed on a road;

determining whether each of the plurality of signs is related to an external temperature of the vehicle or an external wind speed of the vehicle;

calculating distance information between the plurality of the signs when all of the signs are related to the external wind speed of the vehicle;

recognizing at least one sign, from among the plurality of signs, installed on the road using a front camera;

determining a type of the at least one sign;

in a case in which the at least one sign corresponds to a crosswind warning sign based on referring to a memory, determining whether a speed sensed by a wind speed sensor installed outside the vehicle is a dangerous wind speed;

in a case in which the speed sensed by the wind speed sensor corresponds to the dangerous wind speed, determining whether a current speed of the vehicle is a dangerous vehicle speed;

in a case in which the current speed of the vehicle is the dangerous vehicle speed, displaying a deceleration notification message due to a crosswind through an instrument panel; and transmitting a command for decelerating the current speed of the vehicle to a drive mode controller.

6. A vehicle comprising:

a camera configured to recognize at least one sign installed on a road; and a controller configured to determine a type of the at least one sign, in a case in which the at least one sign corresponds to a road freezing sign based on referring to a memory, determine whether a temperature sensed by a temperature sensor installed outside the vehicle is a freezing danger temperature, and in a case in which the temperature sensed by the temperature sensor corresponds to the freezing danger temperature, determine whether a drive mode of the vehicle is set to a winter mode, wherein the controller is further configured to display a winter mode automatic switching notification message through an instrument panel and to transmit a command for switching to the winter mode to a drive mode controller in a case in which the drive mode of the vehicle is not set to the winter mode.

7. The vehicle of claim 6, wherein the controller is further configured to in a case in which the at least one sign corresponds to a crosswind warning sign based on referring to a memory, determine whether a speed sensed by a wind speed sensor installed outside the vehicle is a dangerous wind speed, and in a case in which the speed sensed by the wind speed sensor corresponds to the dangerous wind speed, determine whether a current speed of the vehicle is a dangerous vehicle speed.

8. The vehicle of claim 7, wherein the controller is configured to control a deceleration notification message due to a crosswind to be displayed through an instrument panel and to control a command for decelerating the current speed of the vehicle to be transmitted to a drive mode controller in a case in which the speed sensed by the wind speed sensor corresponds to the dangerous wind speed.

9. A vehicle comprising:

a camera configured to recognize at least one sign installed on a road; and a controller configured to determine a type of the at least one sign, in a case in which the at least one sign corresponds to a road freezing sign based on referring to a memory, determine whether a temperature sensed by a temperature sensor installed outside the vehicle is a freezing danger temperature, and in a case in which the temperature sensed by the temperature sensor corresponds to the freezing danger temperature, determine whether a drive mode of the vehicle is set to a winter mode, wherein the controller is further configured to, in a case in which the at least one sign corresponds to a falling stone warning sign based on referring to a memory, determine whether a speed sensed by a wind speed sensor installed outside the vehicle is a falling stone danger wind speed, and in a case in which the speed sensed by the wind speed sensor corresponds to the falling stone danger wind speed, determine whether a sunroof of the vehicle is in an open state, and wherein the controller is configured to control a sunroof automatic closing notification message to be displayed through an instrument panel and to control a command for closing the sunroof to be transmitted to a sunroof controller in a case in which the sunroof of the vehicle is in the open state.

* * * * *